United States Patent
Choi et al.

(10) Patent No.: US 10,637,375 B2
(45) Date of Patent: Apr. 28, 2020

(54) ACTUATOR AND POSITION CONTROL APPARATUS USING VOICE COIL MOTOR METHOD WITH TEMPERATURE COMPENSATION FUNCTION

(71) Applicant: Samsung Electro-Mechanics Co., Ltd., Suwon-si (KR)

(72) Inventors: Woo Young Choi, Suwon-si (KR); Jung Eui Park, Suwon-si (KR); Joo Hyoung Lee, Suwon-si (KR); Joo Yul Ko, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/145,602

(22) Filed: Sep. 28, 2018

(65) Prior Publication Data
US 2019/0190412 A1    Jun. 20, 2019

(30) Foreign Application Priority Data

Dec. 15, 2017 (KR) .................. 10-2017-0173222
Mar. 30, 2018 (KR) .................. 10-2018-0037522

(51) Int. Cl.
*H02K 41/00* (2006.01)
*H02P 6/16* (2016.01)
(Continued)

(52) U.S. Cl.
CPC ............... *H02P 6/16* (2013.01); *H02P 6/006* (2013.01); *H02P 6/28* (2016.02); *H02P 7/025* (2016.02);
(Continued)

(58) Field of Classification Search
CPC .......... G02B 27/646; G03B 2205/0069; G03B 5/00; H02P 25/034; H02P 6/16; H02P 6/28; H02P 7/025
See application file for complete search history.

(56) References Cited

U.S. PATENT DOCUMENTS 6,393,373 B1 * 5/2002 Duyar ................. G01R 31/343
                                                         318/490
2017/0329242 A1   11/2017 Zhuang

FOREIGN PATENT DOCUMENTS

JP        2016-218256 A     12/2016
KR        10-1166418 B1      7/2012
(Continued)

OTHER PUBLICATIONS

Korean Office Action dated Jul. 13, 2019 in counterpart Korean Patent Application No. 10-2018-0037522 (6 pages in English and 6 pages in Korean).

(Continued)

*Primary Examiner* — Karen Masih
(74) *Attorney, Agent, or Firm* — NSIP Law

(57) ABSTRACT

A actuator using a voice coil motor (VCM) method includes a coil configured to face a magnetic member disposed on a lateral surface of a lens carrier, and be spaced apart from the magnetic member, a driving circuit configured to supply a composite current including a driving current and a position detection current to the coil based on a composite voltage input to the driving circuit, and an impedance/digital conversion circuit configured to convert an alternating current (AC) voltage signal including a specific frequency component acquired at opposite ends of the coil via a demodulation scheme, extract a low-frequency signal having an inductance component of the coil, and detect a position signal based on the low-frequency signal.

18 Claims, 5 Drawing Sheets

(51) Int. Cl.
    *H02P 6/00*            (2016.01)
    *H02P 6/28*            (2016.01)
    *H02P 7/025*          (2016.01)
    *H02P 25/034*       (2016.01)
    *G02B 27/64*          (2006.01)
    *G03B 5/00*            (2006.01)
    *H04N 5/225*         (2006.01)

(52) U.S. Cl.
    CPC .......... *H02P 25/034* (2016.02); *G02B 27/646* (2013.01); *G03B 5/00* (2013.01); *G03B 2205/0007* (2013.01); *G03B 2205/0069* (2013.01); *H04N 5/2252* (2013.01); *H04N 5/2253* (2013.01)

(56) References Cited

FOREIGN PATENT DOCUMENTS

| | | |
|---|---|---|
| KR | 10-2014-0088308 A | 7/2014 |
| KR | 10-2017-0091648 A | 8/2017 |

OTHER PUBLICATIONS

Baker, R. Jacob, et al., "Design of Bandpass Delta-Sigma Modulators: Avoiding Common Mistakes," 2007, PowerPoint presentation presented at various universities and companies, available online at ResearchGate (30 pages in English).

\* cited by examiner

ACTUATOR AND POSITION CONTROL APPARATUS USING VOICE COIL MOTOR METHOD WITH TEMPERATURE COMPENSATION FUNCTION

CROSS-REFERENCE TO RELATED APPLICATIONS

This application claims the benefit under 35 USC 119(a) of Korean Patent Application Nos. 10-2017-0173222 filed on Dec. 15, 2017, and 10-2018-0037522 filed on Mar. 30, 2018, in the Korean Intellectual Property Office, the entire disclosures of which are incorporated herein by reference for all purposes.

BACKGROUND

1. Field

This application relates to an actuator and a position control apparatus using a voice coil motor (VCM) method with a temperature compensation function.

2. Description of Related Art

There is a demand for a camera module for a mobile phone that is slim and is able to capture a high-quality image. To satisfy these requirements, it is necessary to provide a lens having a high aperture ratio and functions such as autofocus (AF) and optical image stabilization (OIS) in a camera module for a portable phone. However, it is necessary to accurately detect a current position of a lens to perform autofocus or OIS.

A conventional method of detecting and controlling a position of a lens uses a Hall sensor and a position sensing magnet.

When a conventional Hall sensor is used, a separate position sensing magnet is needed, and a reference value for a position of the Hall sensor may change depending on temperature and other external factors. To compensate for this change, an additional circuit such as a low-pass filter, an automatic gain control amplifier, a differential to single-ended amplifier, or an analog-to-digital converter is disadvantageously needed.

When an external Hall sensor is used, a bias current, which may be several mA, is consumed in driving the Hall sensor, and additional current is consumed by related circuits, thereby decreasing the operating time of a mobile phone.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an actuator using a voice coil motor (VCM) method includes a coil configured to face a magnetic member disposed on a lateral surface of a lens carrier, and be spaced apart from the magnetic member; a driving circuit configured to supply a composite current including a driving current and a position detection current to the coil based on a composite voltage input to the driving circuit; and an impedance/digital conversion circuit configured to convert an alternating current (AC) voltage signal including a specific frequency component acquired at opposite ends of the coil via a demodulation scheme, extract a low-frequency signal having an inductance component of the coil, and detect a position signal based on the low-frequency signal.

The impedance/digital conversion circuit may be further configured to remove a high-frequency signal having a resistance component of the coil, converted via the demodulation scheme, to compensate for temperature variations causing variations in the resistance component.

The impedance/digital conversion circuit may include a first filter configured to extract the AC voltage signal from the opposite ends of the coil; a demodulator configured to demodulate the AC voltage signal extracted from the first filter to generate a demodulation signal including the high-frequency signal having the resistance component of the coil and the low-frequency signal having the inductance component of the coil; a second filter configured to block the high-frequency signal included in the demodulation signal and extract the low-frequency signal; a voltage-controlled oscillator configured to convert the low-frequency signal extracted by the second filter into a frequency signal based on a magnitude of the extracted low-frequency signal; and a digital filter configured to extract a frequency component of the frequency signal and detect the position signal based on the detected frequency component, the position signal including position information.

The demodulator may include a local oscillator configured to generate a local oscillation signal having a same frequency as the specific frequency component of the AC voltage signal, and a phase difference of 90 degrees from the AC voltage signal; and a mixer configured to mix the AC voltage signal and the local oscillation signal to generate the demodulation signal.

The AC voltage signal may be $k*|ZL|*\cos(\omega*t+\theta)$, and the local oscillator may be further configured to generate, as the local oscillation signal, a sine wave signal $\sin(\omega*t)$ having a phase difference of 90 degrees from the AC voltage signal.

The AC voltage signal may be $k*|ZL|*\cos(\omega*t+\theta)$, and the local oscillator may be further configured to generate, as the local oscillation signal, a cosine wave signal $\cos(\omega*t)$ having a phase difference of 180 degrees from the AC voltage signal.

In another general aspect, a position control apparatus using a voice coil motor (VCM) method includes a driving circuit configured to supply a composite current including a driving current and a position detection current to a coil based on a composite voltage input to the driving circuit, the coil being configured to face a magnetic member disposed on a lateral surface of a lens carrier, and be spaced apart from the magnetic member; an impedance/digital conversion circuit configured to convert an alternating current (AC) voltage signal including a specific frequency component acquired at opposite ends of the coil via a demodulation scheme, block a high-frequency signal having a resistance component of the coil, extract a low-frequency signal having an inductance component of the coil, compensate for temperature variations causing variations in a parasitic resistance of the coil, and detect a position signal including position information based on the extracted low-frequency signal; and a processor configured to control the driving circuit based on the position signal including the position information from the impedance/digital conversion circuit and a control signal for controlling the magnetic member to move toward a target position.

The position control apparatus may further include a memory configured to store instructions executable by the processor, and the processor may be further configured to execute the instructions to configure the processor to control the driving circuit based on the position signal including the position information from the impedance/digital conversion circuit and the control signal for controlling the magnetic member to move toward the target position.

The composite voltage may include a driving voltage and a position detection voltage, and the controller may be further configured to generate the composite voltage based on the position signal and the control signal, and provide the composite voltage to the driving circuit.

The impedance/digital conversion circuit may include a first filter configured to extract the AC voltage signal from the opposite ends of the coil; a demodulator configured to demodulate the AC voltage signal extracted by the first filter to generate a demodulation signal including the high-frequency signal having the resistance component of the coil and the low-frequency signal having the inductance component of the coil; a second filter configured to block the high-frequency signal included in the demodulation signal and extract the low-frequency signal included in the demodulation signal; a voltage-controlled oscillator configured to convert the low-frequency signal extracted by the second filter into a frequency signal based on a magnitude of the extracted low-frequency signal; and a digital filter configured to extract a frequency component of the frequency signal and detect the position including the position information based on the frequency component.

The demodulator may include a local oscillator configured to generate a local oscillation signal having a same frequency as the specific frequency component of the AC voltage signal, and a phase difference of 90 degrees from the AC voltage signal; and a mixer configured to mix the AC voltage signal and the local oscillation signal to generate the demodulation signal.

The AC voltage signal may be $k*|ZL|*\cos(\omega*t+\theta)$, and the local oscillator may be further configured to generate, as the local oscillation signal, a sine wave signal $\sin(\omega*t)$ having a phase difference of 90 degrees from the AC voltage signal.

The AC voltage signal may be $k*|ZL|*\cos(\omega*t+\theta)$, and the local oscillator may be further configured to generate, as the local oscillation signal, a cosine wave signal $\cos(\omega*t)$ having a phase difference of 180 degrees from the AC voltage signal.

In another general aspect, an actuator using a voice coil motor method includes a coil configured to face a magnetic member disposed on a lens carrier, and be spaced apart from the magnetic member; a driving circuit configured to supply a composite current to the coil, the composite current including a driving current for moving the magnetic member, and a position detection current for use in detecting a position of the magnetic member; and an impedance/digital conversion circuit configured to extract an alternating current (AC) voltage signal having a specific frequency from a voltage across opposite ends of the coil generated by the composite driving current flowing through the coil, demodulate the extracted AC voltage signal to obtain a demodulation signal, extract a low-frequency signal representing an inductance component of an impedance of the coil from the demodulation signal, and convert the extracted low-frequency signal to a position signal representing a position of the magnetic member.

The driving current may be a direct current (DC) current, and the position detection current may be an AC current having the specific frequency.

The impedance/digital conversion circuit may include a first filter configured to extract the AC voltage signal having the specific frequency from the voltage across the opposite ends of the coil; a demodulator configured to demodulate the extracted AC voltage signal according to a demodulation scheme to obtain the demodulation signal, the demodulation signal including the low-frequency signal and a high-frequency signal representing a resistance component of the impedance of the coil; a second filter configured to extract the low-frequency signal from the demodulation signal and block the high-frequency signal; a voltage-controlled oscillator to convert the extracted low-frequency signal to a frequency signal based on a magnitude of the extracted low-frequency signal; and a digital filter configured to convert the frequency signal to a position signal representing a position of the magnetic member.

The resistance component of the impedance of the coil may be a parasitic resistance of the coil, and the blocking of the high-frequency signal by the second filter may compensate for temperature variations causing variations in the parasitic resistance, The inductance component of the impedance of the coil may vary as the magnetic member moves relative to the coil, causing the extracted low-frequency signal to vary as the magnetic member moves relative to the coil.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
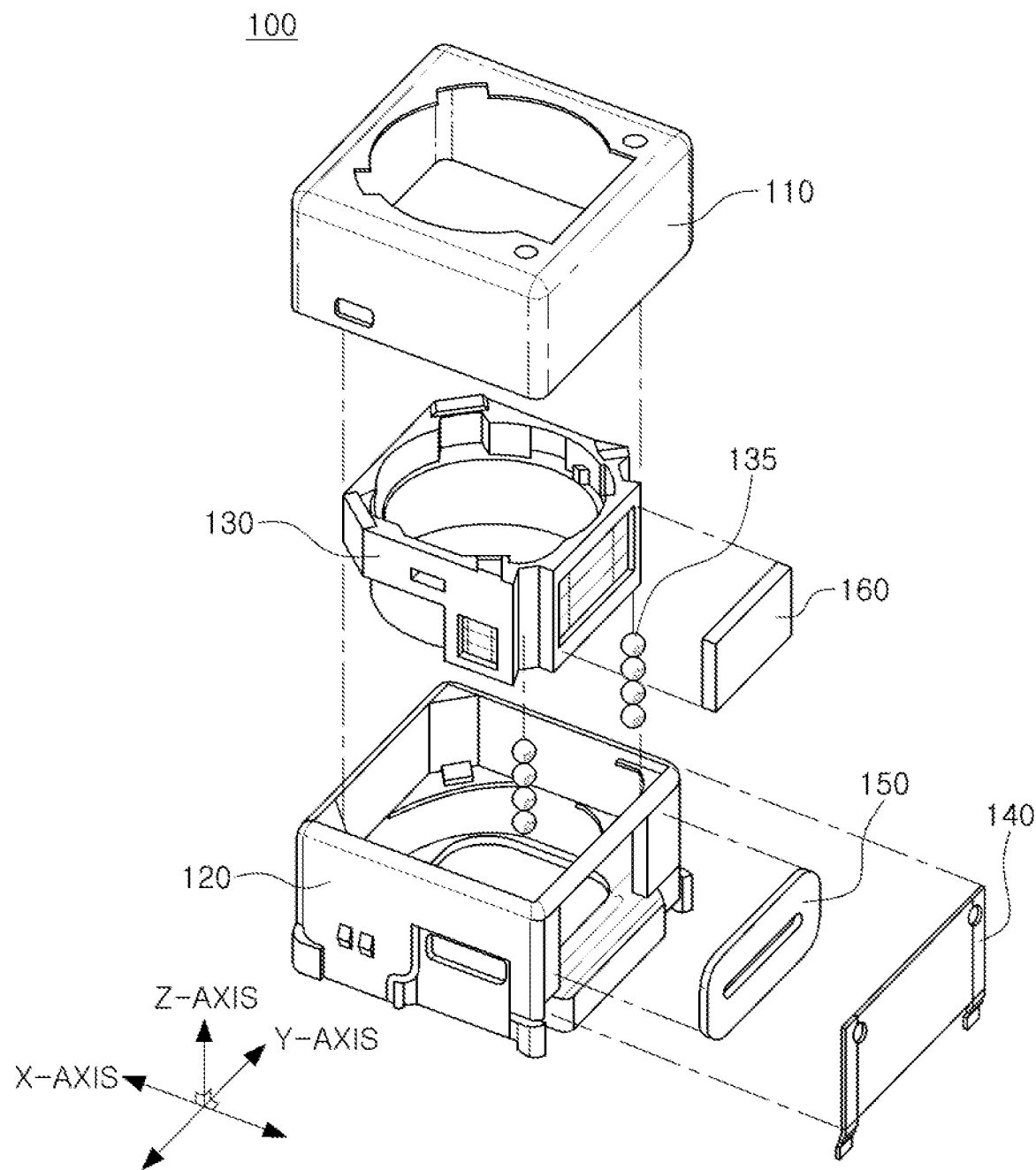
FIG. 1 is a partially exploded perspective view of an example of a camera module using a voice coil motor (VCM) method.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

FIG. 1 is a partially exploded perspective view of a camera module using a voice coil motor (VCM) method.

Referring to FIG. 1, a camera module 100 includes an upper case 110, a housing 120, a lens carrier 130, ball bearings 135, a substrate 140, a coil 150, and a magnetic member 160.

Although FIG. 1 illustrates a ball bearing-type camera module employing ball bearings, the other type of camera modules may be used, for example, a spring-type camera module.

The lens carrier 130 has a hollow shape to accommodate at least one lens for imaging an object disposed along an optical axis in the lens carrier 130. In the example illustrated in FIG. 1, the optical-axis direction is the Z-axis direction.

The lens carrier 130 is disposed in and coupled to the housing 120, is moved in the optical-axis direction for autofocusing, and is moved in a direction perpendicular to the optical-axis direction (the X-axis direction or the Y-axis direction of FIG. 1) for optical image stabilization (OIS).

The housing 120 has an internal space and accommodates the lens carrier 130 in the internal space of the housing 120 so that the lens carrier 130 is movable in the optical-axis direction and the direction perpendicular to the optical axis.

When the lens carrier 130 is moved in the optical-axis direction in the housing 120, at least one ball bearing 135 acts as a guide device for guiding movement of the lens carrier 130 in the optical-axis direction in the lens carrier 130.

The at least one ball bearing 135 is disposed between the lens carrier 130 and the housing 120 to allow one surface of the lens carrier 130 and one surface of the housing 120 to contact each other via the at least one ball bearing 135 and guide movement of the lens carrier 130 in the optical-axis direction while supporting the lens carrier 130 via rolling.

The upper case 110 is coupled to the housing 120 to form an external case of a camera module. The upper case 110 is coupled to the housing 120 to surround a portion of an external surface of the housing 120. The upper case 110 may include metal or may be formed of a metal and may be grounded to a ground pad of a substrate installed below the housing 120, thereby shielding an electromagnetic wave generated during driving of the camera module.

The magnetic member 160 is disposed on a lateral surface of the lens carrier 130 and the coil 150 is disposed on one surface of the substrate 140 mounted on the housing 120 to face the magnetic member 160 and be spaced apart therefrom. For example, the magnetic member 160 may be a magnet including a magnetized magnetic material or a conductor.

With regard to the drawings, a repeated description of components having the same reference numeral and the same function is omitted if possible and a difference in the drawings is described below.

The actuator and the position control apparatus disclosed in this application may be applied to an optical image stabilizer (OIS) or a zoom driver integrated circuit (IC) using a VCM.

A basic principle of the actuator and the position control apparatus disclosed in this application will now be described. For example, when an overlapping area between the magnetic member 160, such as a magnet (or a dielectric substance), and the coil 150 in which an alternating current (AC) flows changes while a gap equal to or greater than a predetermined distance is maintained therebetween, an inductance of the coil 150 changes. In this case, the amplitude (refer to Equation 2 below) and the phase angle of a changed impedance (refer to Equation 1 below) may be sensed to track a current position of a lens.

$$ZL = Rs + j*\omega*Lx = |ZL|*(\cos\theta + j*\sin\theta) \quad (1)$$

$$|ZL| = \sqrt{Rs^2 + (2*\pi*F\mathrm{mod}*Lx)^2}, \theta = \text{Phase Angle} \quad (2)$$

Figure 2:
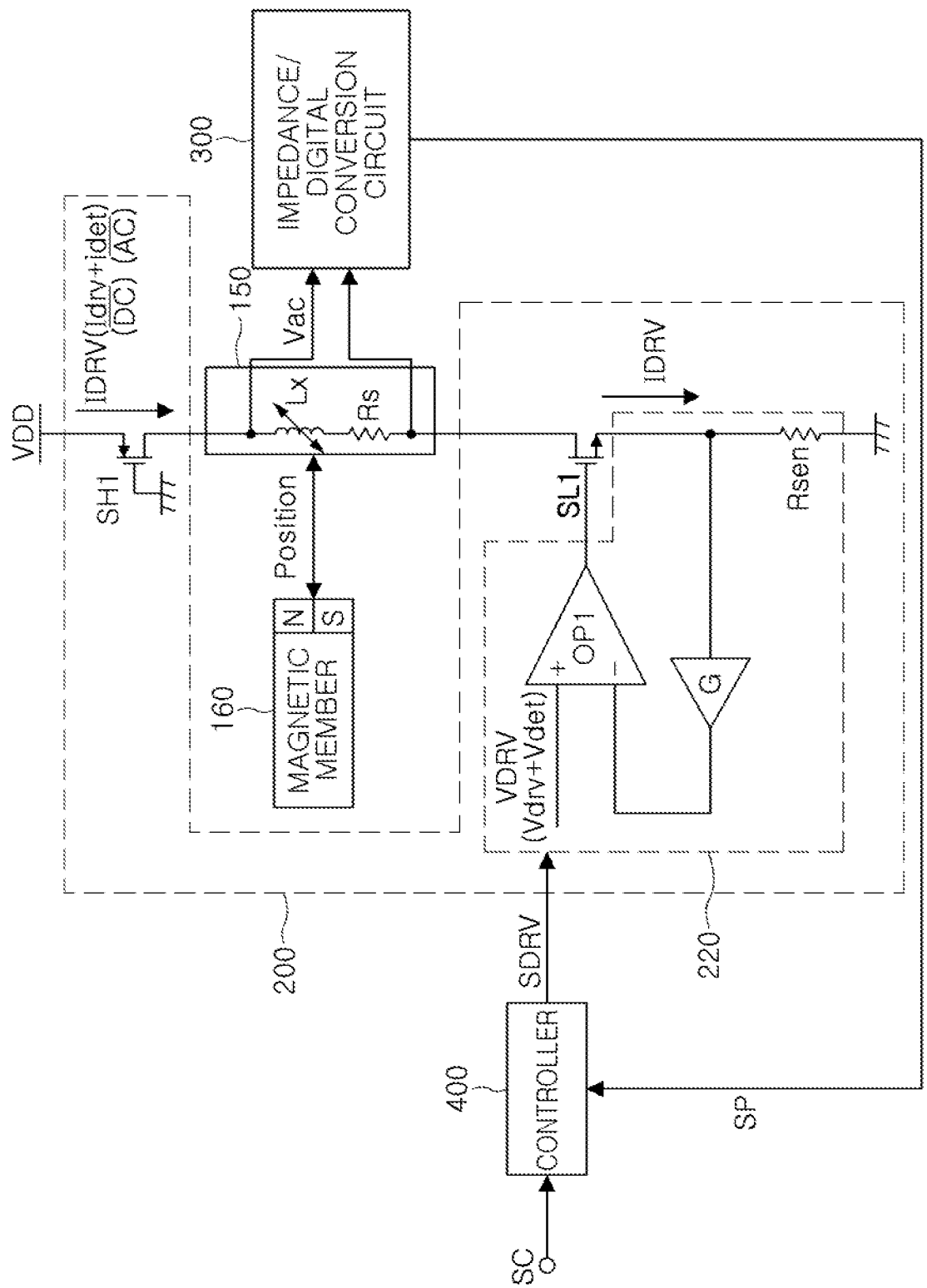
FIG. 2 is a diagram illustrating an example of an actuator and a position control circuit using a voice coil motor (VCM) method in the camera module of FIG. 1.

FIG. 2 is a diagram illustrating an example of an actuator and a position control circuit using a voice coil motor (VCM) method of the camera module of FIG. 1.

Referring to FIG. 2, the actuator using a VCM method includes the coil 150, a driving circuit 200, and an impedance/digital conversion circuit 300.

The position control circuit using a VCM method includes the driving circuit 200, the impedance/digital conversion circuit 300, and a controller 400.

The coil 150 faces and is spaced apart from the magnetic member 160 disposed on a lateral surface of the lens carrier 130. For example, the coil 150 may be formed on one surface of the substrate 140 (refer to FIG. 1) mounted on the housing 120 (refer to FIG. 1) to face the magnetic member 160 and is spaced apart from the magnetic member 160 to provide an electromagnetic driving force to the magnetic member 160. Accordingly, the coil 150 transmits a driving force to the magnetic member 160 and provides a position detection voltage Vac including inductance information corresponding to position information of the magnetic member 160 to the impedance/digital conversion circuit 300.

The magnetic member 160 is disposed on a lateral surface of the lens carrier 130 and moves according to the driving force of the coil 150.

The driving circuit 200 applies a composite current IDRV including a driving current Idrv and a position detection current idet to the coil 150 based on a composite voltage VDRV input from the controller 400.

For example, the driving circuit 200 provides the position detection current idet to the coil 150. The position detection current idet includes a specific frequency component Fmod. The specific frequency component Fmod is a frequency for measuring variations in an impedance of the coil 150 without influencing the driving of the lens carrier 130, and may be, for example, a frequency higher than an audible frequency.

For example, the driving circuit 200 may provide the position detection current idet to the coil 150 independently of the driving current Idrv. In another example, to more accurately and rapidly perform closed-loop control of a position, the driving circuit 200 may provide the composite current IDRV formed by a mixture of the position detection current idet and the driving current Idrv to the coil 150.

For example, the position detection current idet may be an AC current including at least one specific frequency component Fmod, and may be, for example, a sinusoidal wave current, a triangle wave current, a sawtooth wave current, or a square wave current. current, or the like.

However, the position detection current idet is not limited to the above examples, but may be any AC current including a specific frequency component.

For example, when the driving circuit 200 applies the driving current Idrv to the coil 150, an electromagnetic force is generated while current flows in the coil 150 and a driving force is provided to the magnetic member 160 due to the electromagnetic force. For example, when the driving circuit 200 applies the driving current Idrv to the coil 150, a magnetic field is generated in the coil 150 and interacts with a magnetic field of the magnetic member 160 to generate a driving force for moving the lens carrier 130 in the optical-axis direction or a direction perpendicular thereto according to Fleming's left hand rule. Due to the driving force, the lens carrier 130 moves in the optical-axis direction or the direction perpendicular thereto.

In the example illustrated in FIG. 2, the driving circuit 200 includes a bridge circuit SH1 and SL1 and a bridge driving circuit including OP1, Rsen, and G.

For example, the bridge circuit SH1 and SL1 includes a high-side transistor SH1 connected to one end of the coil 150 and a low-side transistor SL1 connected to the other end of the coil 150. The bridge circuit is a circuit for supplying a driving current to the coil 150, and may be a half-bridge circuit or a full-bridge circuit, but is not limited to the examples of the bridge circuit described in this application.

The bridge driving circuit OP1, Rsen, and G supplies the composite current IDRV formed via a mixture of the DC driving current Idrv and the AC position detection current idet to the coil 150 in response to the composite voltage VDRV.

For example, the bridge driving circuit OP1, Rsen, and G includes an operational amplifier OP1 for controlling the low-side transistor SL1 to allow the composite current to flow through the low-side transistor SL1, a resistor Rsen for detecting a voltage, and a gain amplifier G for amplifying the detected voltage.

For example, the operational amplifier OP1 receives the composite voltage VDRV formed by a mixture of a DC driving voltage Vdrv and an AC position detection voltage Vdet and controls the low-side transistor SL1 based on the composite voltage VDRV to allow the composite current IDRV (=Idrv(DC)+idet(AC)) to flow through the resistor Rsen and the low-side transistor SL1.

For example, the driving circuit 200 may include a driver integrated circuit (IC) for providing a driving current to the coil 150.

For example, the driving current Idrv is a direct current (DC) generated by the driving circuit 200 for driving the lens carrier 130, and the position detection current idet is generated by the driving circuit 200 for detecting a position of the lens carrier 130 and is an alternating current (AC) having the specific frequency component Fmod as described above.

The position detection voltage Vac is an AC voltage for position detection acquired at opposite ends of the coil 150 and includes the specific frequency component Fmod.

For example, the composite current IDRV is represented by Equation 3 below.

$$IDRV = Idrv + idet = Idrv + k^* \cos(2^*\pi^* F\,\text{mod}^* t) \quad (3)$$

In Equation 3 above, Idrv is the driving current, and idet is the position detection current and is defined as $k^*\cos(2^*\pi^*Fmod^*t)$ above. In addition, k is the amplitude of the position detection current idet.

The amplitude k and the frequency Fmod of the position detection current idet do not affect driving of the lens carrier 130 and are in ranges suitable for measuring a variation of an inductance of the coil 150. For example, the amplitude k of the position detection current idet may be low enough compared with the amplitude of the DC driving current so that the position detection current idet does not affect driving of the lens carrier 130. Also, the frequency Fmod of the position detection current idet is a frequency that does not affect driving of the lens carrier 130, that is, the frequency Fmod does not cause movement or resonance of the lens carrier 130.

For example, the amplitude k of the position detection current idet is smaller than the amplitude of the DC driving current idry and the frequency Fmod of the position detection current idet is higher than an audible frequency. For example, if the amplitude of the driving current idry is 100 mA, the amplitude k of the position detection current idet may be 5 mA and the frequency Fmod of the position detection current idet may be 100 kHz.

For example, when a driving current idry close to DC is used, a modulation scheme of mixing an AC position detection current idet with a DC driving current idry may be employed to use a coil for both driving and sensing as illustrated in FIG. 2. In summary, as described above, the amplitude and the frequency of the AC position detection current idet need to be set to the following conditions: the amplitude and the frequency of the AC position detection current idet need to be within ranges that do not affect driving and are suitable for measuring an inductance variation.

In particular, an inductance variation is small, and thus a circuit for converting the inductance variation is additionally needed, and accordingly this application discloses a method of enhancing an accuracy of converting an impedance amplitude variation of the coil 150 into a position value by the impedance/digital conversion circuit 300.

A peak voltage Vac_peak of the position detection voltage Vac including the impedance amplitude variation (inductance information) of the coil 150 may be represented by Equation 4 below.

$$Vac\_peak = Iac\_peak \times |ZL| \qquad (4)$$

In Equation 4 above, Vac_peak is a peak value of an AC voltage to be acquired at opposite ends of the coil 150 and is a peak value of a position detection voltage including impedance amplitude information. Iac_peak is a peak value of an AC current including the impedance amplitude information.

In the sensorless structure disclosed in this application, a method of measuring an amplitude of an AC voltage acquired at opposite ends of the coil 150 by mixing an AC position detection current with a DC driving current and applying the AC position detection current mixed with the DC driving current to a driving coil and more accurately detecting a position of a lens by measuring impedance variations based on a position change of a lens carrier will be described in more detail below.

The impedance amplitude information of the coil 150 may include an undesirable variation due to an effect of a parasitic resistance component Rs of the coil 150, and in particular, the resistance component is sensitive to temperature. In this regard, when a surrounding temperature is increased due to a driving current, a large error may occur in a total variation in impedance, thus this application discloses a technology of removing an effect of changing temperature due to the resistance component to enhance the accuracy of extracting position information of a lens via an impedance change (more accurately, an inductance variation), and this technology is included in the impedance/digital conversion circuit 300.

The impedance/digital conversion circuit 300 blocks (excludes) a high-frequency signal having a resistance component of the coil 150 generated by converting an AC voltage signal Vac including the specific frequency component Fmod acquired at opposite ends of the coil 150 via a demodulation scheme, extracts a low-frequency signal having an inductance component of the coil 150 corresponding to a reactance component of an impedance of the coil 150, and detects a position signal SP including position information based on the extracted low-frequency signal.

The controller 400 controls the driving circuit 200 based on the position signal SP including position information from the impedance/digital conversion circuit 300 and a control signal SC for controlling the magnetic member 160 to move toward a target position.

For example, the controller 400 provides the composite voltage VDRV including the driving voltage Vdrv and the position detection voltage Vdet to the driving circuit 200 based on the position signal SP including the position information and the control signal SC including the target position information. For example, the controller 400 provides a composite signal SDRV for position control or position error control to the driving circuit 200 based on the position signal SP and the control signal SC to minutely control a position of the magnetic member 160. The composite signal SDRV may be the composite voltage VDRV, and although examples in this application are described in terms of the composite voltage VDRV, the examples are not limited thereto.

As described above, the impedance/digital conversion circuit 300 excludes a resistance component as a high-frequency component and extracts only a reactance component as a low-frequency component from a demodulation signal Sdmod (refer to FIG. 4) generated by mixing the AC voltage signal Vac and a local oscillation signal SLo (refer to FIG. 4) having the same frequency as the specific frequency component Fmod and a phase difference of 90 degrees using an I/O demodulation scheme.

The resistance component is excluded using the I/O demodulation scheme and temperature variations are excluded based on the reactance component, and thus an operation of more accurately detecting a position signal may be performed. The impedance/digital conversion circuit 300 will be described below with reference to FIG. 3.

Figure 3:
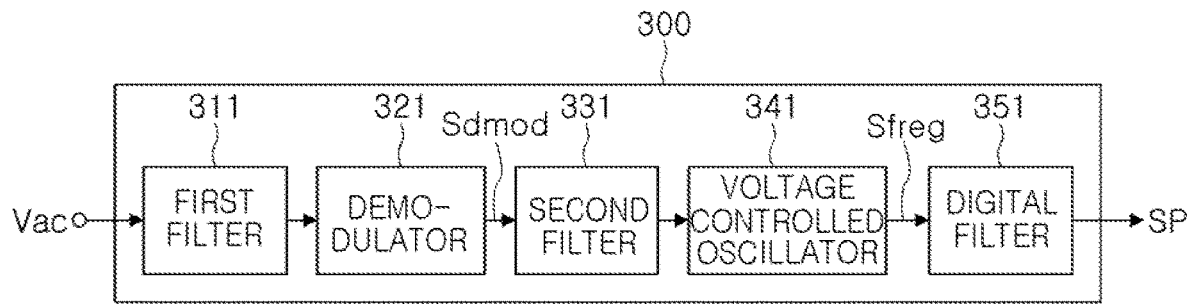
FIG. 3 is a diagram illustrating an example of an impedance/digital conversion circuit of FIG. 2.

FIG. 3 is a diagram illustrating an example of an impedance/digital conversion circuit.

Referring to FIG. 3, the impedance/digital conversion circuit 300 includes a first filter 311, a demodulator 321, a second filter 331, a voltage-controlled oscillator 341, and a digital filter 351.

The first filter 311 extracts an AC voltage signal Vac from the opposite ends of the coil 150. For example, the first filter 311 may be a high-pass filter or a band-pass filter and passes the AC voltage signal Vac including the specific frequency component Fmod acquired at the opposite ends of the coil 150.

The demodulator 321 demodulates the AC voltage signal Vac extracted by the first filter 311 to provide the demodulation signal Sdmod including a high-frequency signal having a resistance component of the coil 150 and a low-frequency signal having an inductance component of the coil 150. For example, the demodulator 321 may be an analog demodulator using a Gilbert cell that is an analog block.

The second filter 331 blocks the high-frequency signal included in the demodulation signal Sdmod from the demodulator 321, passes the low-frequency signal, and extracts only the low-frequency signal. The low-frequency signal passing through the second filter 331 is a signal having a reactance component of the impedance of the coil 150.

The voltage-controlled oscillator 341 converts the low-frequency signal extracted by the second filter 331 into a frequency signal Sfreq based on an amplitude of the extracted signal. For example, the voltage control oscillator 341 may convert an analog signal into a digital signal, and thus may be replaced by an analog-to-digital converter (ADC) for performing the same function.

The digital filter 351 extracts a frequency component of the frequency signal Sfreq from the voltage-controlled oscillator 341, detects the position signal SP including position information based on the frequency component, and provides the position signal SP to the controller 400. The position signal SP may be a position signal corresponding to a position of the magnetic member 160 or a position of a lens. Any of various known methods for extracting the frequency component of the frequency signal Sfreq may be used, such as counting the number of cycles of the frequency signal Sfreq in a predetermined period and dividing the counted number of cycles by the predetermined period to obtain the frequency component of the frequency signal Sfreq. The digital filter 351 is implemented in hardware by digital logic blocks. Alternatively, the digital filter 351 is implemented in hardware by a processor executing instructions that configure the processor to perform the functions of the digital filter 351.

A temperature compensation function will now be described. In Equations 1 and 2 above, the parasitic resistance Rs of the coil 150 is a function of temperature and may be represented by Equation 5 below that is a linear function simplified as follows.

A temperature of the coil 150 will change depending on the amplitude of the driving current of the coil 150, which will affect an impedance value of the coil 150. When a variation of the impedance due to a variation of the parasitic resistance is non-negligibly large compared with a variation of the impedance due to a variation in a position, the accuracy of a position detection will be degraded.

To overcome this problem, this application discloses a method of removing and compensating for a variation due to the parasitic resistance, which will be described below.

$Rs=Rs0\times[1+TCR\times(\text{Temp}-25)]$ $Rs=Rs0\times[1+TCR\times(\text{Temp}-25)]$ (5)

In Equation 5 above, Rs is a parasitic resistance component of the coil 150, Rs0 is a specific resistance component, TCR is a temperature coefficient of parasitic resistance, and Temp is surrounding temperature.

The AC voltage Vac between the opposite ends of the coil 150 may be represented by Equation 6 below by converting an impedance of a coil into an absolute value of an amplitude and a phase angle.

$Vac=k*|ZL|*\cos(\omega*t+\theta)$ (6)

In Equation 6 above, θ is the phase angle, and ω=2*π*Fmod.

The demodulator 321 mixes the AC voltage signal Vac (refer to FIG. 4) from the first filter 311 and the local oscillation signal SLo (refer to FIG. 4) having the same frequency and a phase difference of 90 degrees (or 270 degrees) to provide the demodulation signal Sdmod using a demodulation scheme, which will be described below with reference to FIGS. 4, 5, and 6.

Figure 4:
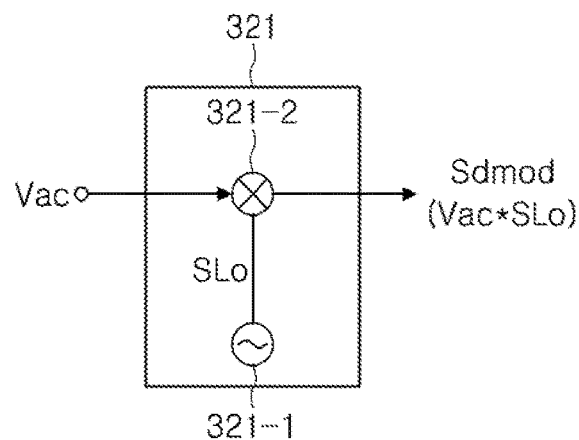
FIG. 4 is a diagram illustrating an example of a demodulator of FIG. 3.

FIG. 4 is a diagram illustrating an example of the demodulator of FIG. 3.

Referring to FIG. 4, the demodulator 321 includes a local oscillator 321-1 and a mixer 321-2.

The local oscillator 321-1 generates the local oscillation signal SLo having the same frequency as the specific frequency component Fmod of the AC voltage signal Vac and a phase difference of 90 degrees from the AC voltage signal Vac and provides the local oscillation signal SLo to the mixer 321-2.

The mixer 321-2 mixes the AC voltage signal Vac and the local oscillation signal SLo to provide the demodulation signal Sdmod.

Figure 5:
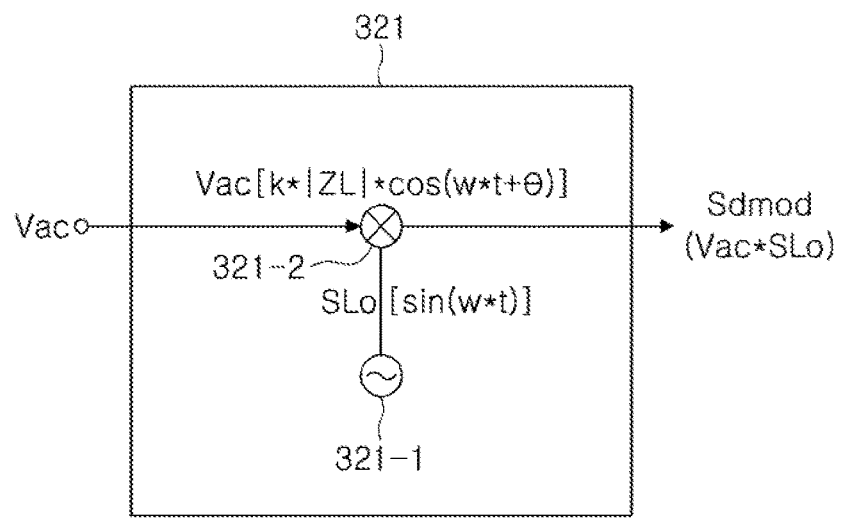
FIG. 5 is a diagram illustrating another example of the demodulator of FIG. 3.

FIG. 5 is a diagram illustrating another example of the demodulator of FIG. 3.

Referring to FIG. 5, the AC voltage signal Vac is k*|ZL|*cos(ω*t+θ), and the local oscillator 321-1 generates a sine wave signal sin(ω*t) having a phase difference of 90 degrees from the AC voltage signal Vac as the local oscillation signal SLo.

In detail with reference to FIG. 5, the demodulator 321 mixes the local oscillation signal SLo, i.e., the sine wave signal sin(ω*t)' (or −sin(ω*t)) having the same frequency as the specific frequency component Fmod of the AC voltage signal Vac of Equation 6 above and a phase difference of 90 degrees (or 270 degrees) from the AC voltage signal Vac, i.e., 'k*|ZL|*cos(ω*t+θ)), from the first filter 311 to provide the demodulation signal Sdmod represented by Equation 7 below using an I/O demodulation scheme.

$k*|ZL|*\cos(\omega*t+\theta)*\sin(\omega*t)=k*|ZL|*[\cos(\omega*t)*\cos\theta-\sin(\omega*t)*\sin\theta]*\sin(\omega*t)=k*|ZL|*[\cos(\omega*t)*\sin(\omega*t)*\cos\theta-\sin(\omega*t)*\sin(\omega*t)*\sin\theta]=k*|ZL|*[\sin(2*\omega*t)*\cos\theta/2-(1-\cos(2*\omega*t))*\sin\theta/2]$ (7)

In Equation 7 above, the demodulation signal Sdmod k*|ZL|*cos(ω*t+θ)*sin(ω*t) may be summarized using a high-frequency component and a low-frequency component according to the last equation of Equation 7 above.

Then, with regard to the demodulation signal Sdmod (refer to Equation 7 above) generated by the demodulator 321, a low-frequency signal having a reactance component −k*ω*Lx/2 illustrated in Equation 8 below may be extracted from an impedance component by the second filter 331. The low-frequency signal having the extracted reactance component −k*ω*Lx/2 is input to the voltage-controlled oscillator 341 and is converted into a frequency signal (or a digital input) having a frequency component based on the amplitude of the signal.

$$-k*|ZL|*\frac{\sin\theta}{2}=-k*\omega*Lx/2 \qquad (8)$$

In Equation 7 above, with regard to the demodulation signal Sdmod k*|ZL|*cos(ω*t+θ)*sin(ω*t), a low-frequency component corresponding to a component Q may be extracted by the second filter 331 from a high-frequency component corresponding to a component I of the I/O demodulation scheme and a low-frequency component corresponding to the component Q.

As illustrated in Equation 8 above, a low-frequency signal having an inductance component (or a reactance component) may be extracted from the impedance component of the coil 150 through this extraction procedure, and the position signal SP based on an inductance component corresponding to an absolute value of a value obtained according to Equation 8 above may be provided to the controller 400.

Figure 6:
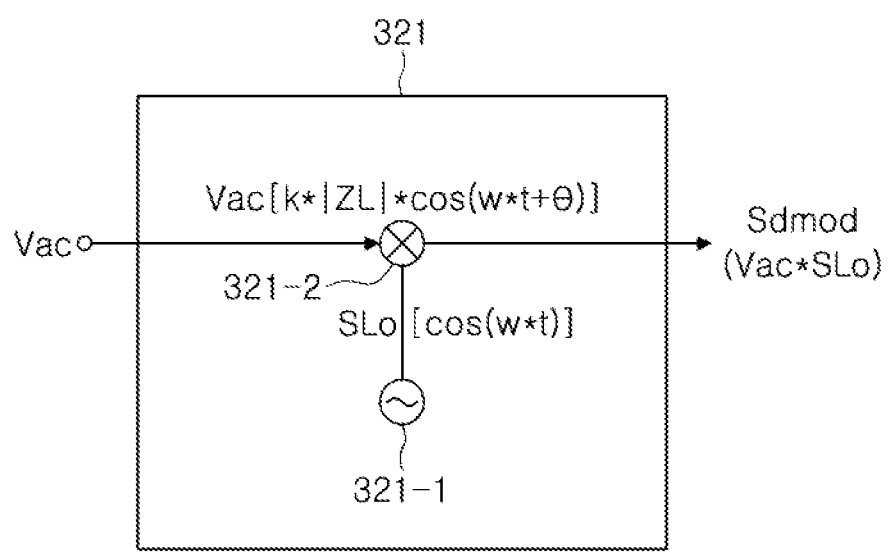
FIG. 6 is a diagram illustrating another example of the demodulator of FIG. 3.

FIG. 6 is a diagram illustrating another example of the demodulator of FIG. 3.

Referring to FIG. 6, the AC voltage signal Vac is k*|ZL|*cos(ω*t+θ), and the local oscillator 321-1 generates a cosine wave signal cos(ω*t) having a phase difference of 180 degrees from the AC voltage signal Vac as the local oscillation signal SLo.

In detail with reference to FIG. 6, similarly to Equations 7 and 8 above, the demodulator 321 mixes the local oscillation signal SLo, i.e., the cosine wave signal cos(ω*t) (or −cos(ω*t)) having the same frequency as the specific frequency component Fmod of the AC voltage signal Vac of Equation 6 above and a phase difference of 360 degrees (or 180 degrees) from the AC voltage signal Vac, i.e., 'k*|ZL|*cos(ω*t+θ), from the first filter 311 to provide the demodulation signal Sdmod represented by Equation 9 below.

$$k*|ZL|*\cos(\omega*t+\theta)*\cos(\omega*t) = k*|ZL|*[\cos(\omega*t)*\cos\theta - \sin(\omega*t)*\sin\theta]*\cos(\omega*t) = k*|ZL|*[\cos(\omega*t)*\cos(\omega*t)*\cos\theta - \sin(\omega*t)*\cos(\omega*t)*\sin\theta] = k*|ZL|*[(1+\cos(2*\omega*t))*\cos\theta/2 - \sin(2*\omega*t)*\sin\theta/2] \quad (9)$$

In Equation 9 above, the demodulation signal Sdmod k*|ZL|*cos(ω*t+θ)*cos(ω*t) may be summarized using a high-frequency component and a low-frequency component according to a last equation of Equation 9 above.

Then, with regard to the demodulation signal Sdmod (refer to Equation 9 above) generated by the demodulator 321, a low-frequency signal having a resistance component k*Rs/2 in Equation 10 below may be extracted from an impedance component by the second filter 331. The extracted low-frequency component may be input to the voltage-controlled oscillator 341 and may lastly be converted into a frequency signal (or a digital signal) having a frequency component based on a size of the component.

$$k*|ZL|*\frac{\cos\theta}{2} = k*Rs/2 \quad (10)$$

In Equation 9 above, with regard to the demodulation signal Sdmod k*|ZL|*cos(ω*t+θ)*cos(ω*t), a component Q may be extracted by the second filter 331 from a high-frequency component corresponding to a component I of an I/O demodulation scheme and a low-frequency component corresponding to the component Q.

A resistance component may be extracted from an impedance component of a coil through the extraction procedure as illustrated in Equation 10 above, and a signal based on a resistance component corresponding to an absolute value of a value obtained through Equation 10 above may be provided to the controller 400.

A parasitic resistance component has a constant temperature coefficient of a core material, and thus may be converted into a digital signal to predict a temperature of the coil. Although a temperature coefficient of inductance is not included in the above equation, the inductance component does in fact have a temperature coefficient, but it has a low influence compared to the temperature coefficient of the parasitic resistance component. However, the temperature coefficient of the inductance component may have a non-negligibly high level compared with a total variation of the inductance with respect to an entire range of a position. Accordingly, the accuracy of a position of a lens may be further enhanced by compensating for the measured temperature of a coil.

The phase angle θ may be obtained from the ratio of absolute values of Equations 8 and 10 above, which is sin θ/cos θ=ω*Lx/Rs, Thus, the phase angle θ may be obtained by taking the arctangent of ω*Lx/Rs.

In the examples described above, the controller 400 of a position control circuit may be embodied in a computing environment in which a processor (e.g., any one or any combination of any two or more of a central processing unit (CPU), a graphics processing unit (GPU), a microprocessor, an application-specific integrated circuit (ASIC), or a field-programmable gate array (FPGA), a memory (e.g., either one or both of a volatile memory (e.g., RAM) and a non-volatile memory (e.g., ROM or a flash memory), an input device (e.g., any one or any combination of any two or more of a keyboard, a mouse, a pen, a voice input device, a touch input device, an infrared camera, and a video input device), an output device (e.g., any one or any combination of any two or more of a display, a speaker, and a printer) and a communications interface unit (e.g., any one or any combination of any two or more of a MODEM, a network interface card (NIC), an integrated network interface, a wireless frequency transmitter/receiver, an infrared port, and a USB interface unit) are connected to each other (e.g., via any one or any combination of any two or more of a peripheral component interface (PCI), a USB connection, a FireWire (IEEE 1394) connection, an optical bus configuration, and a network).

The computing environment may be embodied in a distributed computing environment or the like including a personal computer, a server computer, a handheld or laptop device, a mobile device (mobile phone, PDA, and media player), a multiprocessor system, a consumer electronic device, a minicomputer, a main frame computer, or the arbitrary aforementioned system or device but is not limited thereto.

Figure 7:
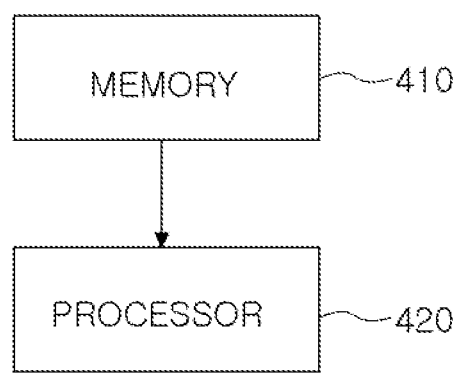
FIG. 7 is a block diagram illustrating an example of a controller of FIG. 2.

FIG. 7 is a block diagram illustrating an example of a controller of FIG. 2.

Referring to FIG. 7, in one example, the controller 400 of FIG. 2 includes a memory 410 and a processor 420. The memory 410 stores instructions that, when executed by the processor 420, cause the processor 420 to perform the functions of the controller 400 in FIG. 2 that are described above.

In the examples described above, a separate sensor such as a Hall sensor is not required when a separate instrument or circuit except for a driving coil is not present, and thus an effect of cost reduction, module size reduction, failure reduction, reduction in a number of process steps, and so on may be achieved.

In addition, although, according to the related art, a coil temperature is indirectly measured using a temperature sensor in an IC, in the examples described above, a position may be advantageously and more accurately detected using a coil as a temperature sensor and compensating for the influence of the temperature of the coil.

In the examples described in this application, an additional sensor such as a Hall sensor or sensing coils is not required, and thus an existing autofocus (AF) control system may be advantageously used without change.

The driver 1100 and the position detector 1400 in FIG. 3, the driver 1100, the controller 1110, the driving circuit 1120, and the position detector 1400 in FIG. 4, the driver 1100, the controller 1110, and the driving circuit 1120 in FIG. 5, the position detector 1400, the frequency detector 1410, and the frequency-to-position converter 1430 in FIG. 8, and the actuator controller 1500, the memory 1510, the processor 1520, the controller 1110, the position detector 1400, the frequency detector 1410, and the frequency-to-position converter 1430 in FIG. 9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, transistors, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods described with reference to FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator using a voice coil motor (VCM) method, the actuator comprising:
    a coil configured to face a magnetic member disposed on a lateral surface of a lens carrier, and be spaced apart from the magnetic member;
    a driving circuit configured to supply a composite current comprising a driving current and a position detection current to the coil based on a composite voltage input to the driving circuit; and an impedance/digital conversion circuit configured to convert an alternating current (AC) voltage signal comprising a specific frequency component acquired at opposite ends of the coil via a demodulation scheme, extract a low-frequency signal having an inductance component of the coil, and detect a position signal based on the low-frequency signal.

2. The actuator of claim 1, wherein the impedance/digital conversion circuit is further configured to remove a high-frequency signal having a resistance component of the coil, converted via the demodulation scheme, to compensate for temperature variations causing variations in the resistance component.

3. The actuator of claim 1, wherein the impedance/digital conversion circuit comprises:
 a first filter configured to extract the AC voltage signal from the opposite ends of the coil;
 a demodulator configured to demodulate the AC voltage signal extracted from the first filter to generate a demodulation signal comprising the high-frequency signal having the resistance component of the coil and the low-frequency signal having the inductance component of the coil;
 a second filter configured to block the high-frequency signal included in the demodulation signal and extract the low-frequency signal;
 a voltage-controlled oscillator configured to convert the low-frequency signal extracted by the second filter into a frequency signal based on a magnitude of the extracted low-frequency signal; and
 a digital filter configured to extract a frequency component of the frequency signal and detect the position signal based on the detected frequency component, the position signal comprising position information.

4. The actuator of claim 3, wherein the demodulator comprises:
 a local oscillator configured to generate a local oscillation signal having a same frequency as the specific frequency component of the AC voltage signal, and a phase difference of 90 degrees from the AC voltage signal; and
 a mixer configured to mix the AC voltage signal and the local oscillation signal to generate the demodulation signal.

5. The actuator of claim 4, wherein the AC voltage signal is $k*|ZL|*\cos(\omega*t+\theta)$, and
 the local oscillator is further configured to generate, as the local oscillation signal, a sine wave signal $\sin(\omega*t)$ having a phase difference of 90 degrees from the AC voltage signal.

6. The actuator of claim 4, wherein the AC voltage signal is $k*|ZL|*\cos(\omega*t+\theta)$, and
 the local oscillator is further configured to generate, as the local oscillation signal, a cosine wave signal $\cos(\omega*t)$ having a phase difference of 180 degrees from the AC voltage signal.

7. A position control apparatus using a voice coil motor (VCM) method, the position control apparatus comprising:
 a driving circuit configured to supply a composite current comprising a driving current and a position detection current to a coil based on a composite voltage input to the driving circuit, the coil being configured to face a magnetic member disposed on a lateral surface of a lens carrier, and be spaced apart from the magnetic member;
 an impedance/digital conversion circuit configured to convert an alternating current (AC) voltage signal comprising a specific frequency component acquired at opposite ends of the coil via a demodulation scheme, block a high-frequency signal having a resistance component of the coil, extract a low-frequency signal having an inductance component of the coil, compensate for temperature variations causing variations in a parasitic resistance of the coil, and detect a position signal comprising position information based on the extracted low-frequency signal; and
 a processor configured to control the driving circuit based on the position signal comprising the position information from the impedance/digital conversion circuit and a control signal for controlling the magnetic member to move toward a target position.

8. The position control apparatus of claim 7, further comprising a memory configured to store instructions executable by the processor,
 wherein the processor is further configured to execute the instructions to configure the processor to control the driving circuit based on the position signal comprising the position information from the impedance/digital conversion circuit and the control signal for controlling the magnetic member to move toward the target position.

9. The position control apparatus of claim 7, wherein the composite voltage comprises a driving voltage and a position detection voltage, and
 the controller is further configured to generate the composite voltage based on the position signal and the control signal, and provide the composite voltage to the driving circuit.

10. The position control apparatus of claim 7, wherein the impedance/digital conversion circuit comprises:
 a first filter configured to extract the AC voltage signal from the opposite ends of the coil;
 a demodulator configured to demodulate the AC voltage signal extracted by the first filter to generate a demodulation signal comprising the high-frequency signal having the resistance component of the coil and the low-frequency signal having the inductance component of the coil;
 a second filter configured to block the high-frequency signal included in the demodulation signal and extract the low-frequency signal included in the demodulation signal;
 a voltage-controlled oscillator configured to convert the low-frequency signal extracted by the second filter into a frequency signal based on a magnitude of the extracted low-frequency signal; and
 a digital filter configured to extract a frequency component of the frequency signal and detect the position comprising the position information based on the frequency component.

11. The position control apparatus of claim 10, wherein the demodulator comprises:
 a local oscillator configured to generate a local oscillation signal having a same frequency as the specific frequency component of the AC voltage signal, and a phase difference of 90 degrees from the AC voltage signal; and
 a mixer configured to mix the AC voltage signal and the local oscillation signal to generate the demodulation signal.

12. The position control apparatus of claim 11, wherein the AC voltage signal is $k*|ZL|*\cos(\omega*t+\theta)$, and the local oscillator is further configured to generate, as the local oscillation signal, a sine wave signal $\sin(\omega*t)$ having a phase difference of 90 degrees from the AC voltage signal.

13. The position control apparatus of claim 11, wherein the AC voltage signal is $k*|ZL|*\cos(\omega*t+\theta)$, and
the local oscillator is further configured to generate, as the local oscillation signal, a cosine wave signal $\cos(\omega*t)$ having a phase difference of 180 degrees from the AC voltage signal.

14. An actuator using a voice coil motor method, the actuator comprising:
a coil configured to face a magnetic member disposed on a lens carrier, and be spaced apart from the magnetic member;
a driving circuit configured to supply a composite current to the coil, the composite current comprising a driving current for moving the magnetic member, and a position detection current for use in detecting a position of the magnetic member; and
an impedance/digital conversion circuit configured to extract an alternating current (AC) voltage signal having a specific frequency from a voltage across opposite ends of the coil generated by the composite driving current flowing through the coil, demodulate the extracted AC voltage signal to obtain a demodulation signal, extract a low-frequency signal representing an inductance component of an impedance of the coil from the demodulation signal, and convert the extracted low-frequency signal to a position signal representing a position of the magnetic member.

15. The actuator of claim 14, wherein the driving current is a direct current (DC) current, and the position detection current is an AC current having the specific frequency.

16. The actuator of claim 14, wherein the impedance/digital conversion circuit comprises:
a first filter configured to extract the AC voltage signal having the specific frequency from the voltage across the opposite ends of the coil;
a demodulator configured to demodulate the extracted AC voltage signal according to a demodulation scheme to obtain the demodulation signal, the demodulation signal comprising the low-frequency signal and a high-frequency signal representing a resistance component of the impedance of the coil;
a second filter configured to extract the low-frequency signal from the demodulation signal and block the high-frequency signal;
a voltage-controlled oscillator to convert the extracted low-frequency signal to a frequency signal based on a magnitude of the extracted low-frequency signal; and
a digital filter configured to convert the frequency signal to a position signal representing a position of the magnetic member.

17. The actuator of claim 16, wherein the resistance component of the impedance of the coil is a parasitic resistance of the coil, and
the blocking of the high-frequency signal by the second filter compensates for temperature variations causing variations in the parasitic resistance.

18. The actuator of claim 14, wherein the inductance component of the impedance of the coil varies as the magnetic member moves relative to the coil, causing the extracted low-frequency signal to vary as the magnetic member moves relative to the coil.

* * * * *